March 25, 1941. A. FREYDBERG ET AL 2,236,472
METHOD AND APPARATUS FOR MAKING SHOULDER PADS
Filed Oct. 20, 1937 12 Sheets-Sheet 1
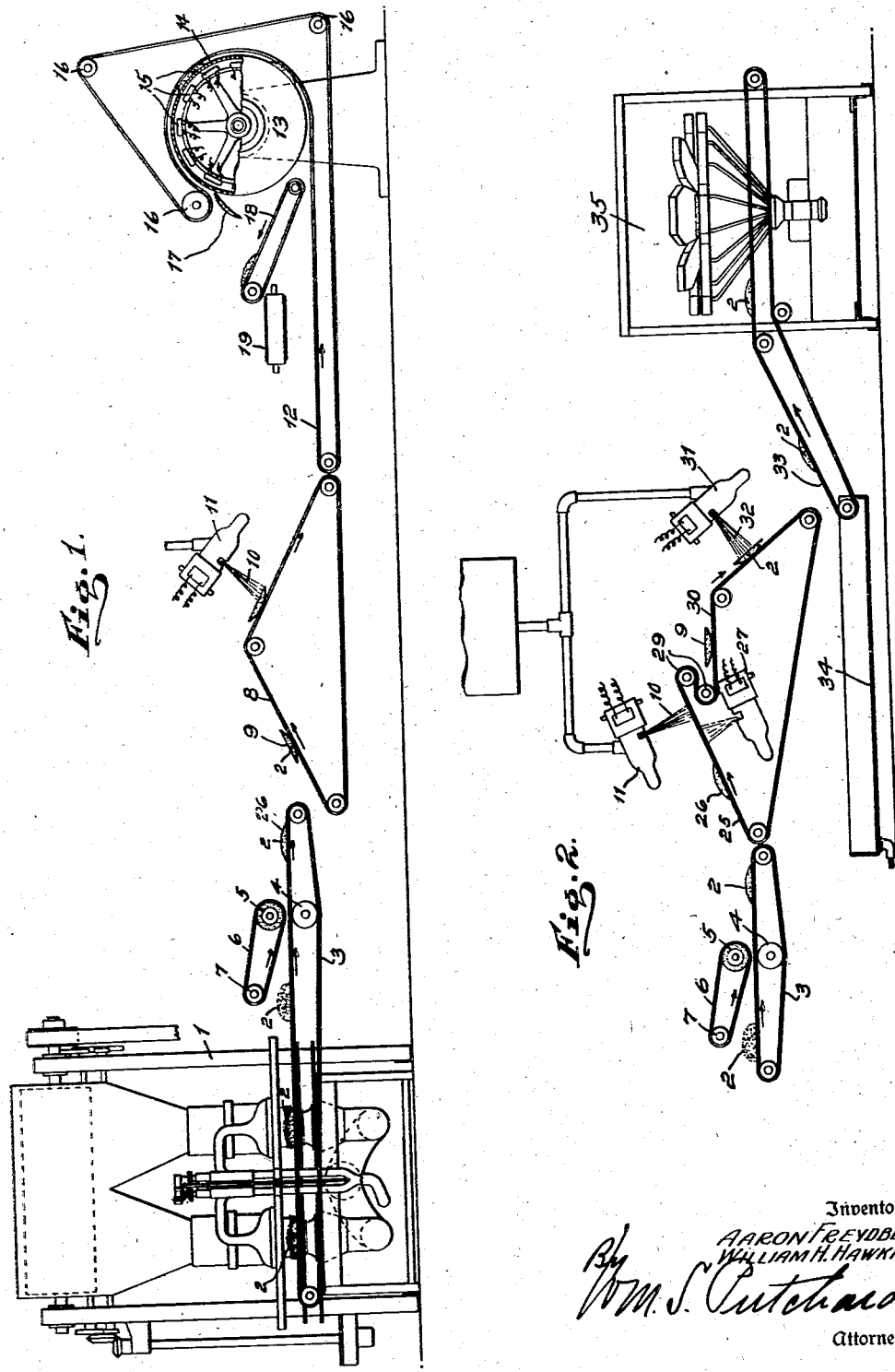
Inventors
AARON FREYDBERG
WILLIAM H. HAWKINS
By Wm. S. Pritchard
Attorney

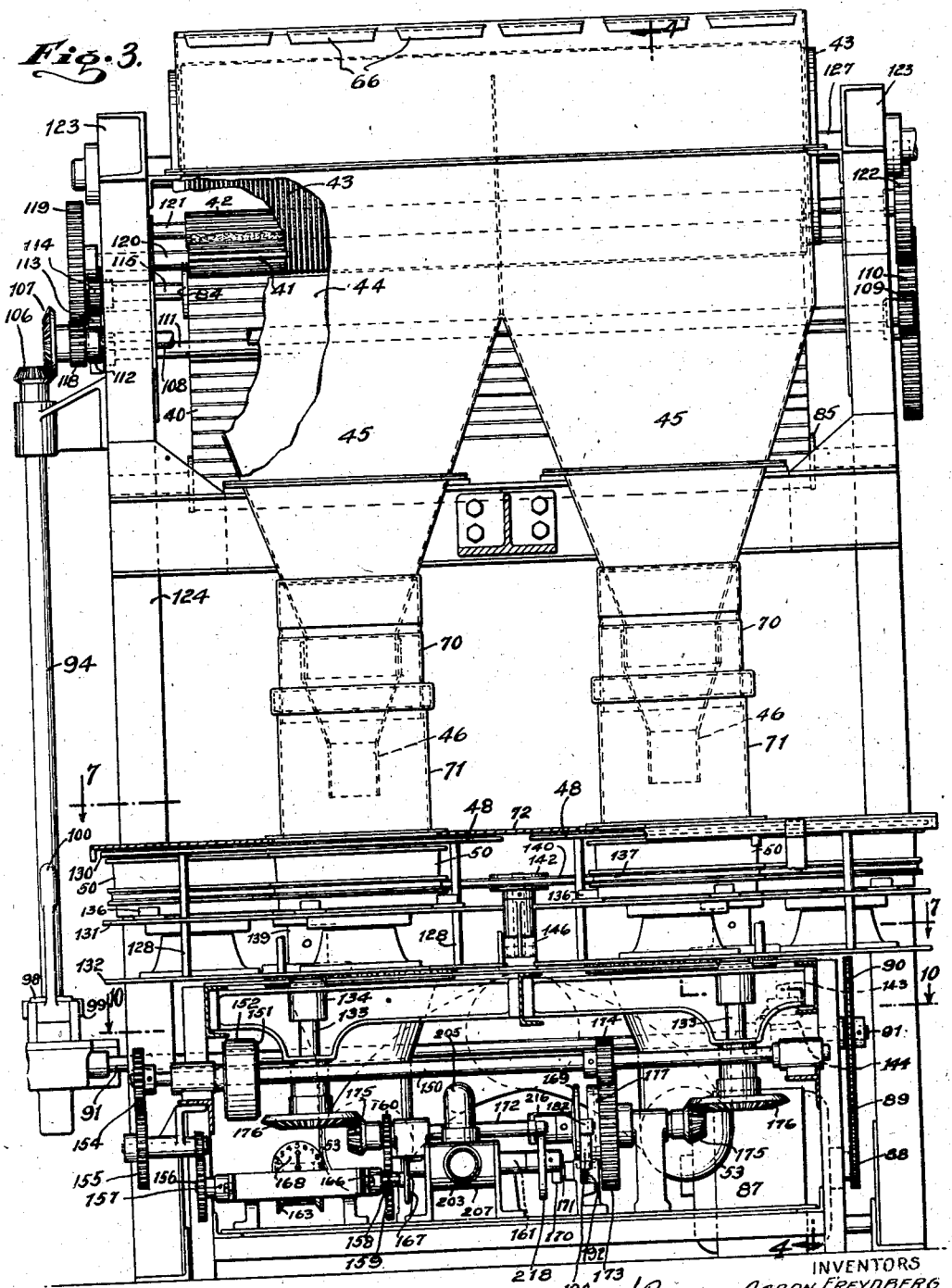

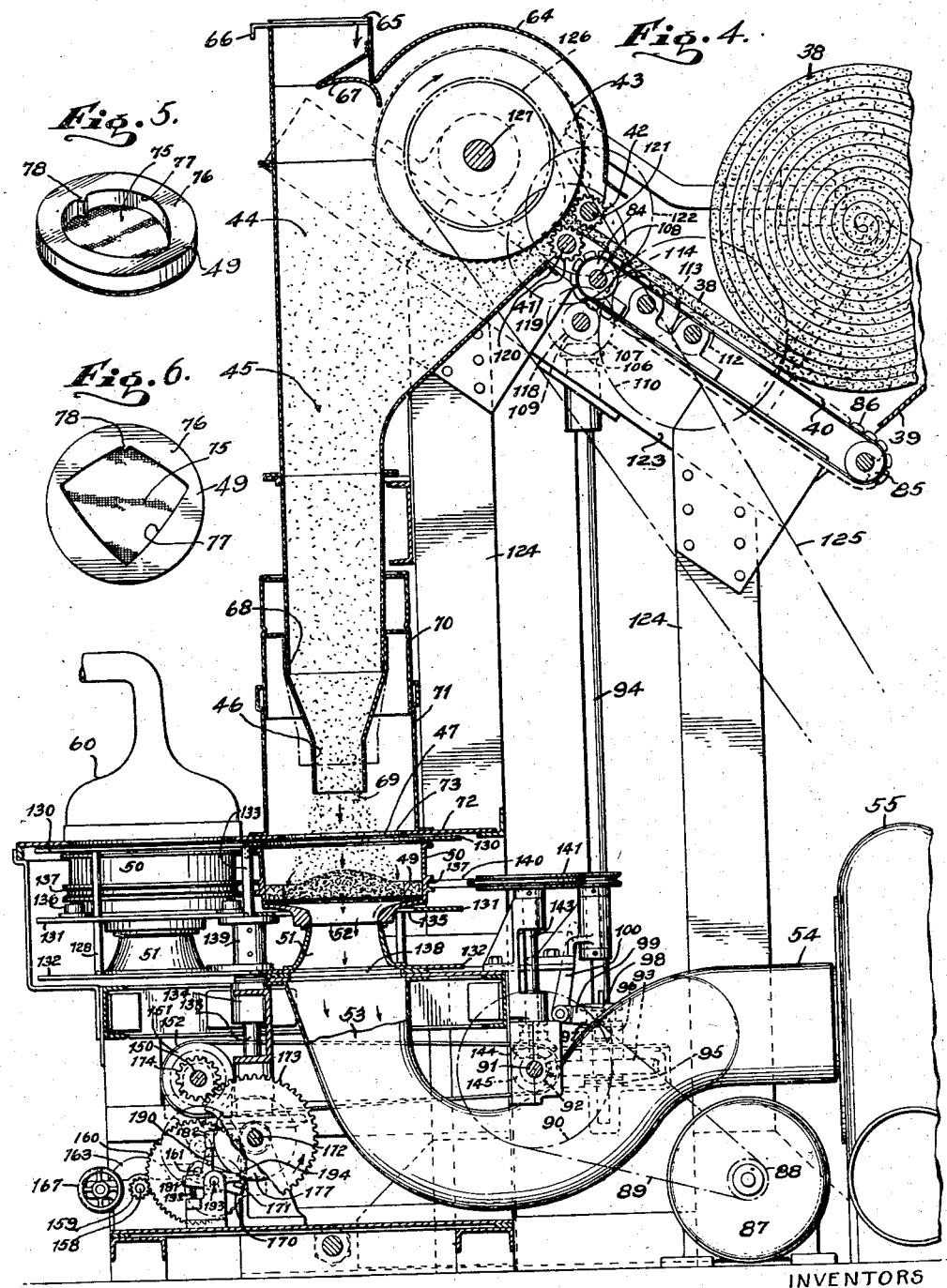

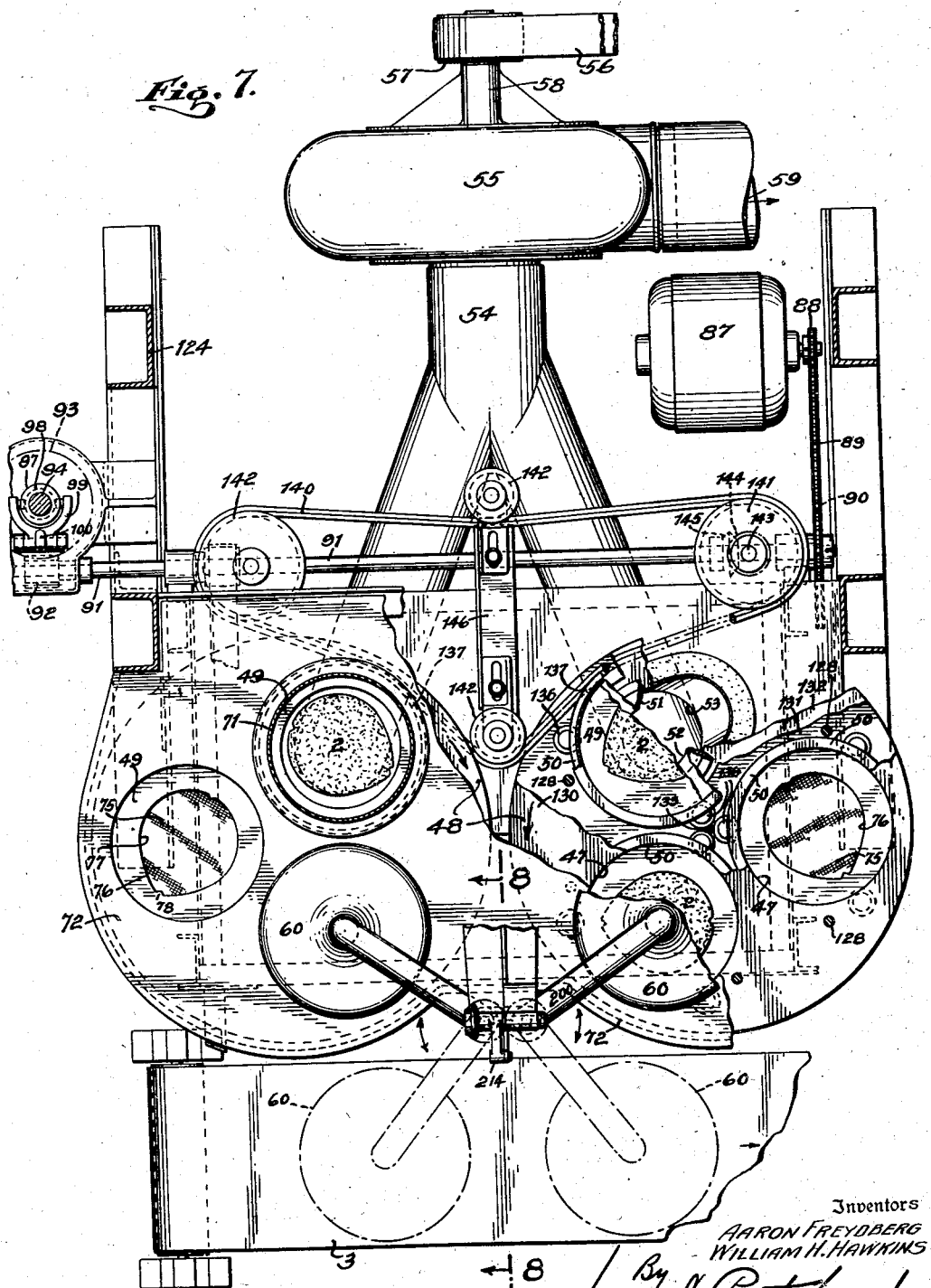

March 25, 1941. A. FREYDBERG ET AL 2,236,472
METHOD AND APPARATUS FOR MAKING SHOULDER PADS
Filed Oct. 20, 1937 12 Sheets-Sheet 5
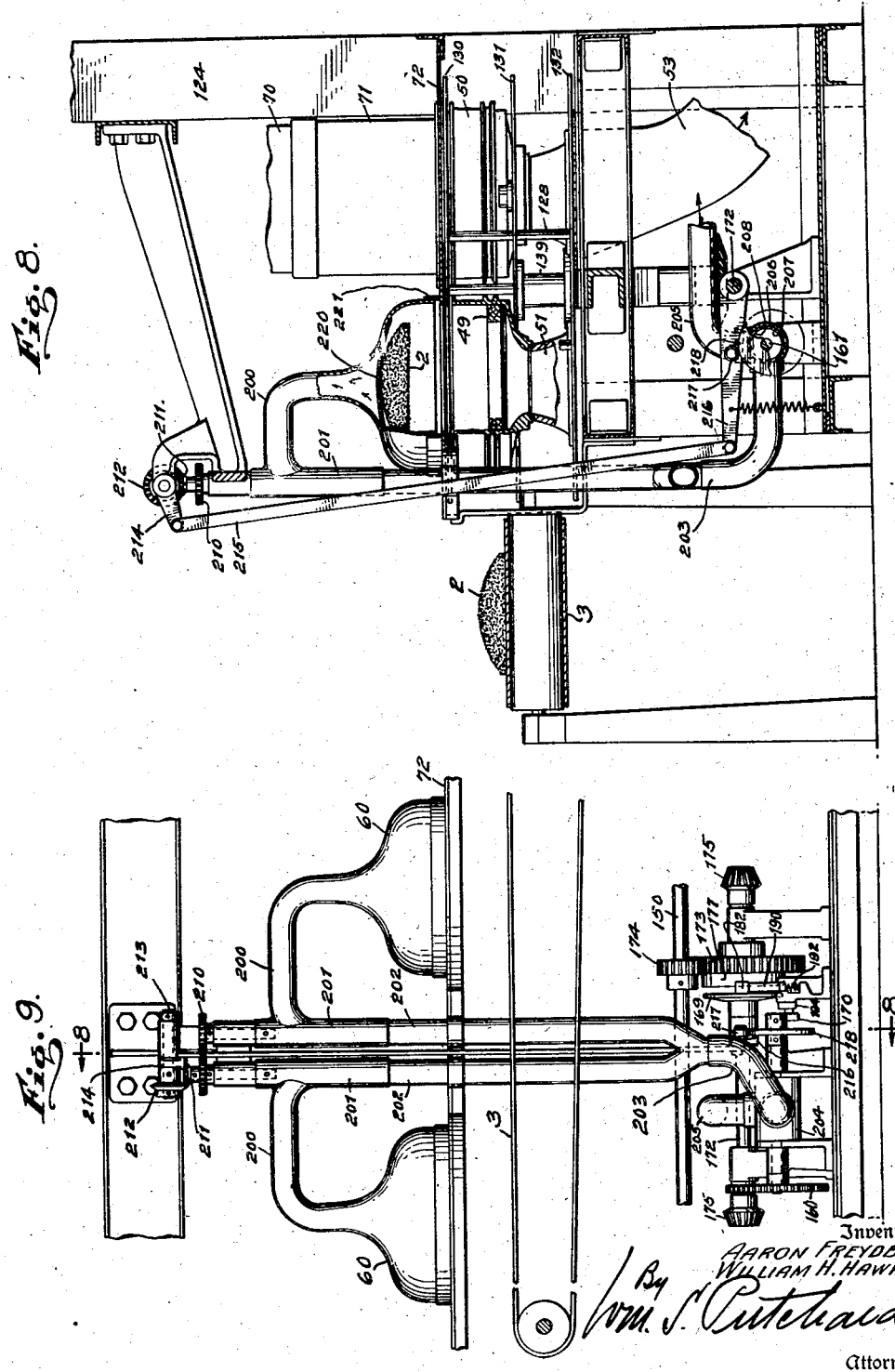
Inventors
AARON FREYDBERG
WILLIAM H. HAWKINS
By Wm. S. Pritchard
Attorney

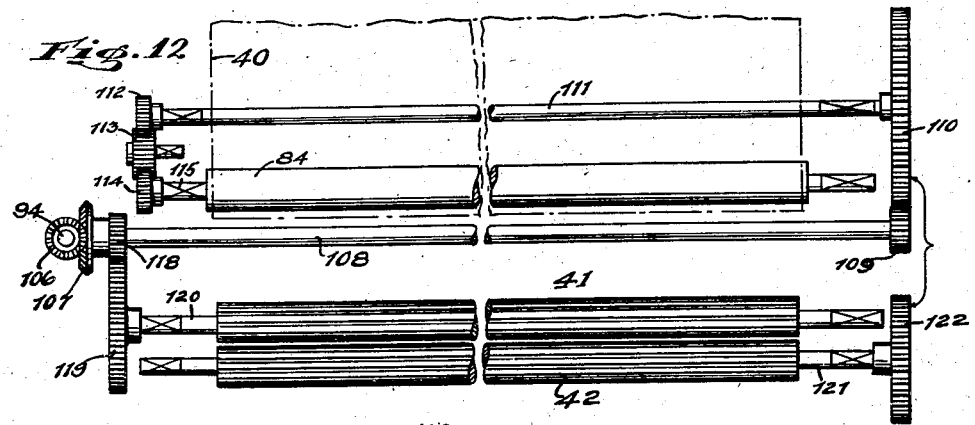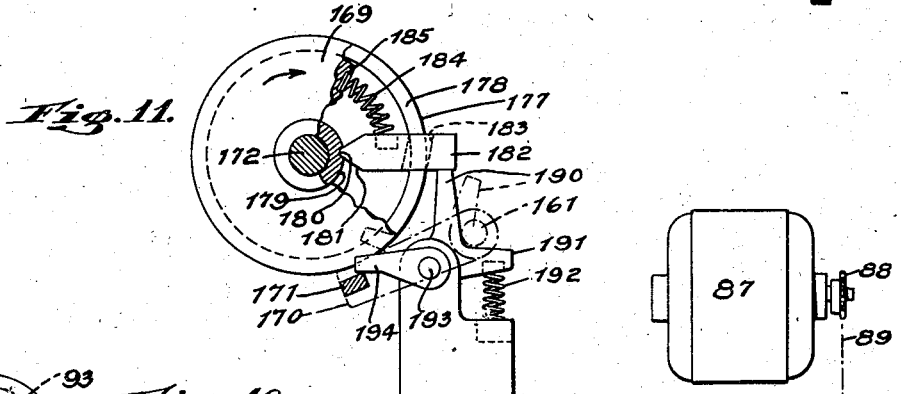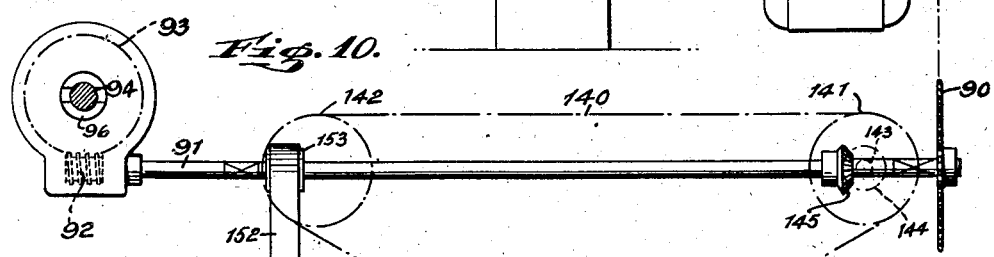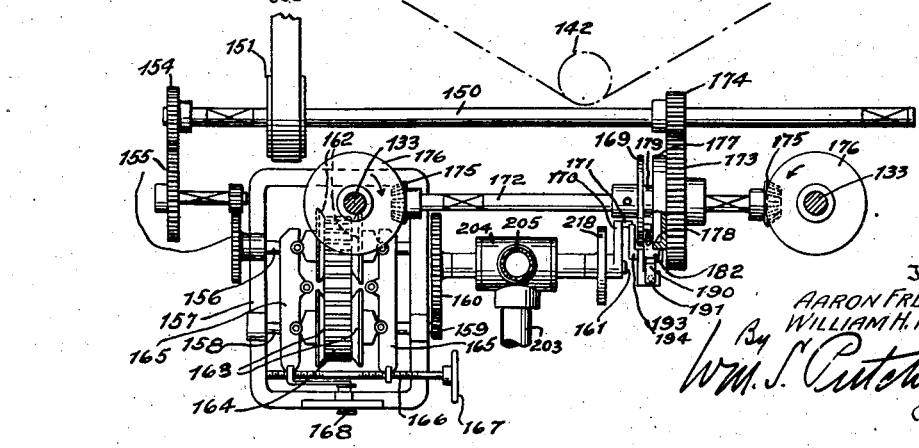

March 25, 1941.   A. FREYDBERG ET AL   2,236,472
METHOD AND APPARATUS FOR MAKING SHOULDER PADS
Filed Oct. 20, 1937   12 Sheets-Sheet 7

Inventors
AARON FREYDBERG
WILLIAM H. HAWKINS
By Wm. S. Pritchard
Attorney

March 25, 1941.   A. FREYDBERG ET AL   2,236,472
METHOD AND APPARATUS FOR MAKING SHOULDER PADS
Filed Oct. 20, 1937   12 Sheets-Sheet 8
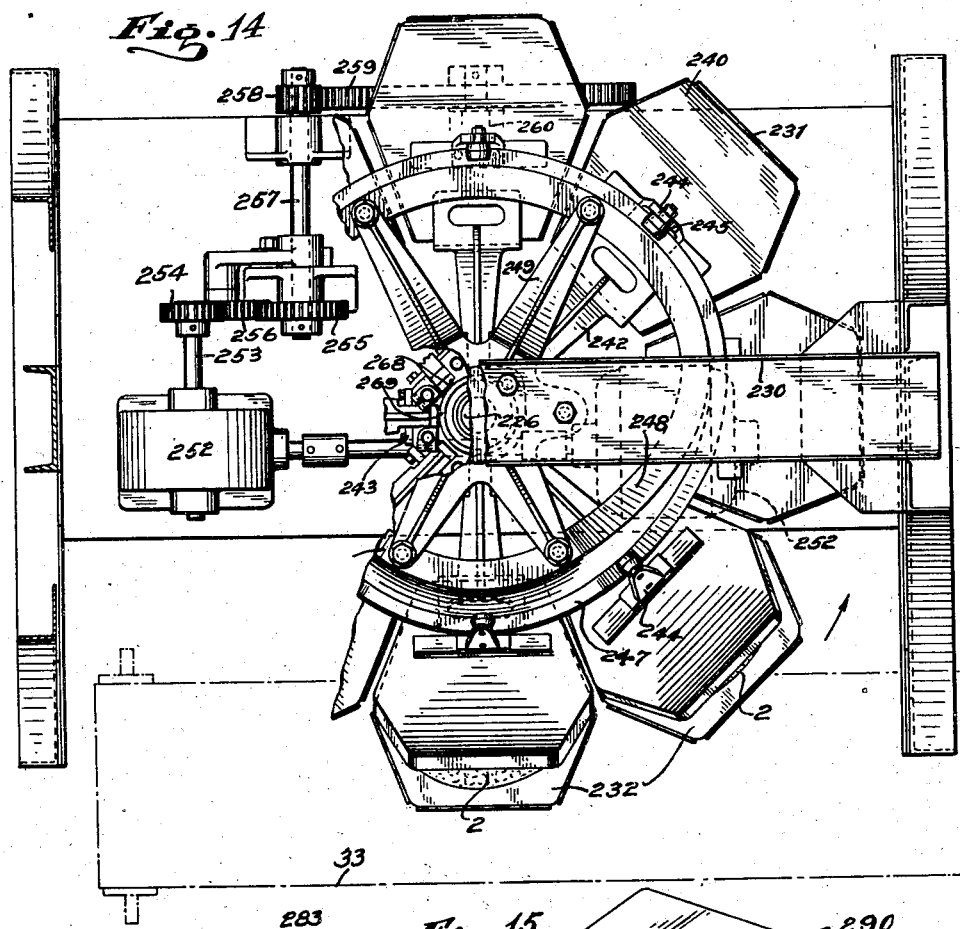
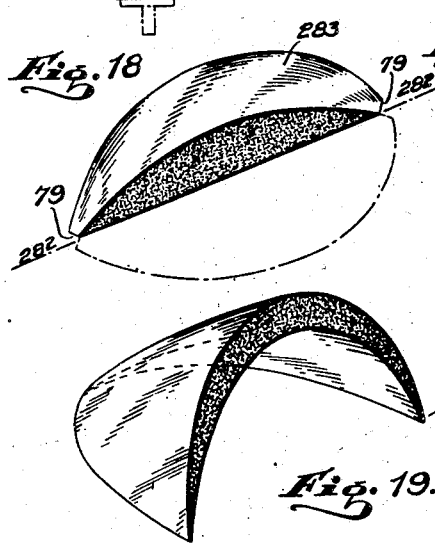
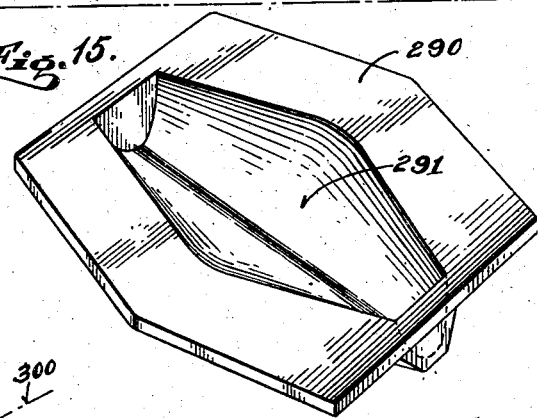
Inventors
AARON FREYDBERG
WILLIAM H. HAWKINS
By Wm. S. Pritchard
Attorney March 25, 1941. A. FREYDBERG ET AL 2,236,472
METHOD AND APPARATUS FOR MAKING SHOULDER PADS
Filed Oct. 20, 1937   12 Sheets-Sheet 9
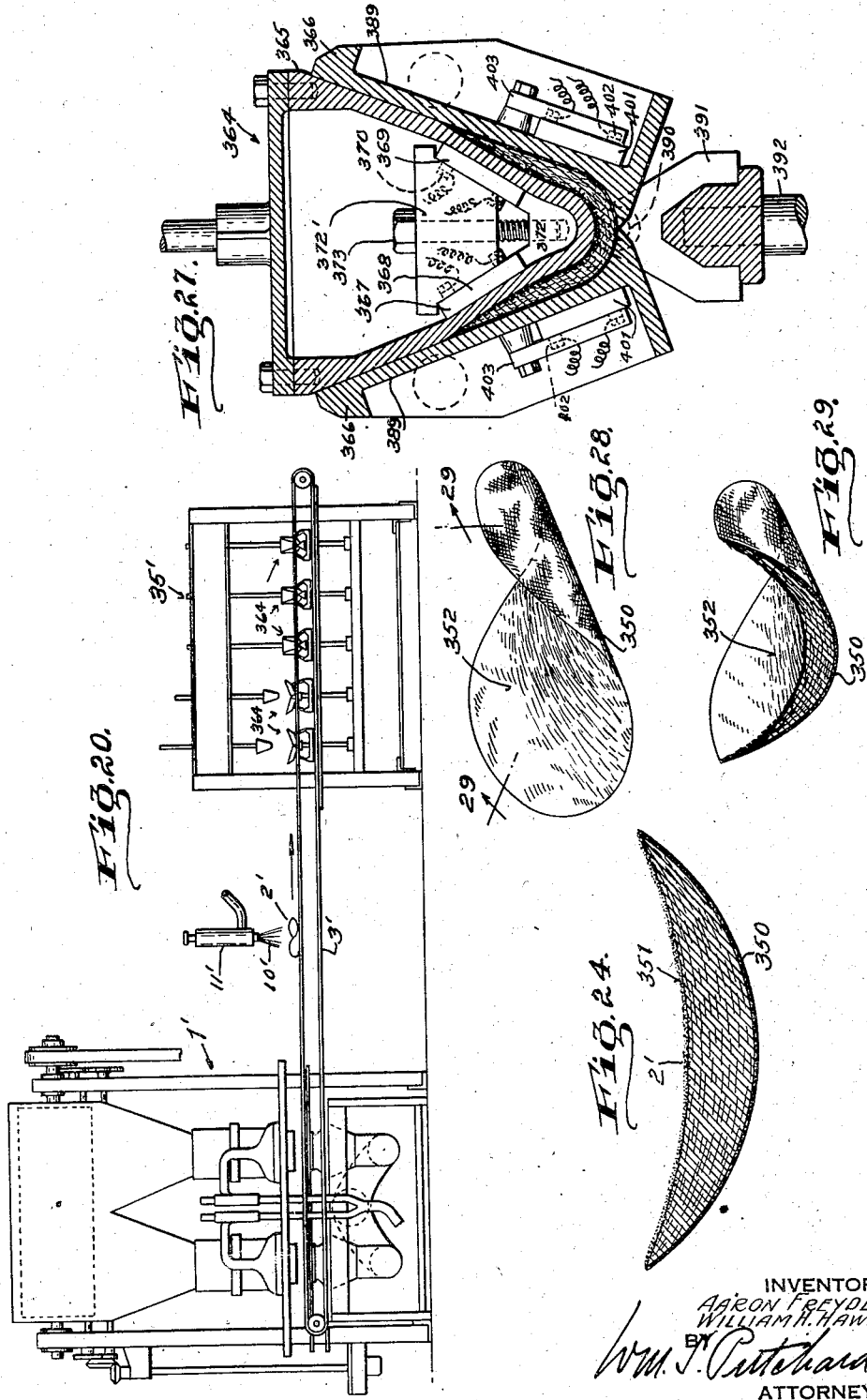
INVENTORS
AARON FREYDBERG
WILLIAM H. HAWKINS
BY
Wm. J. Pritchard
ATTORNEY

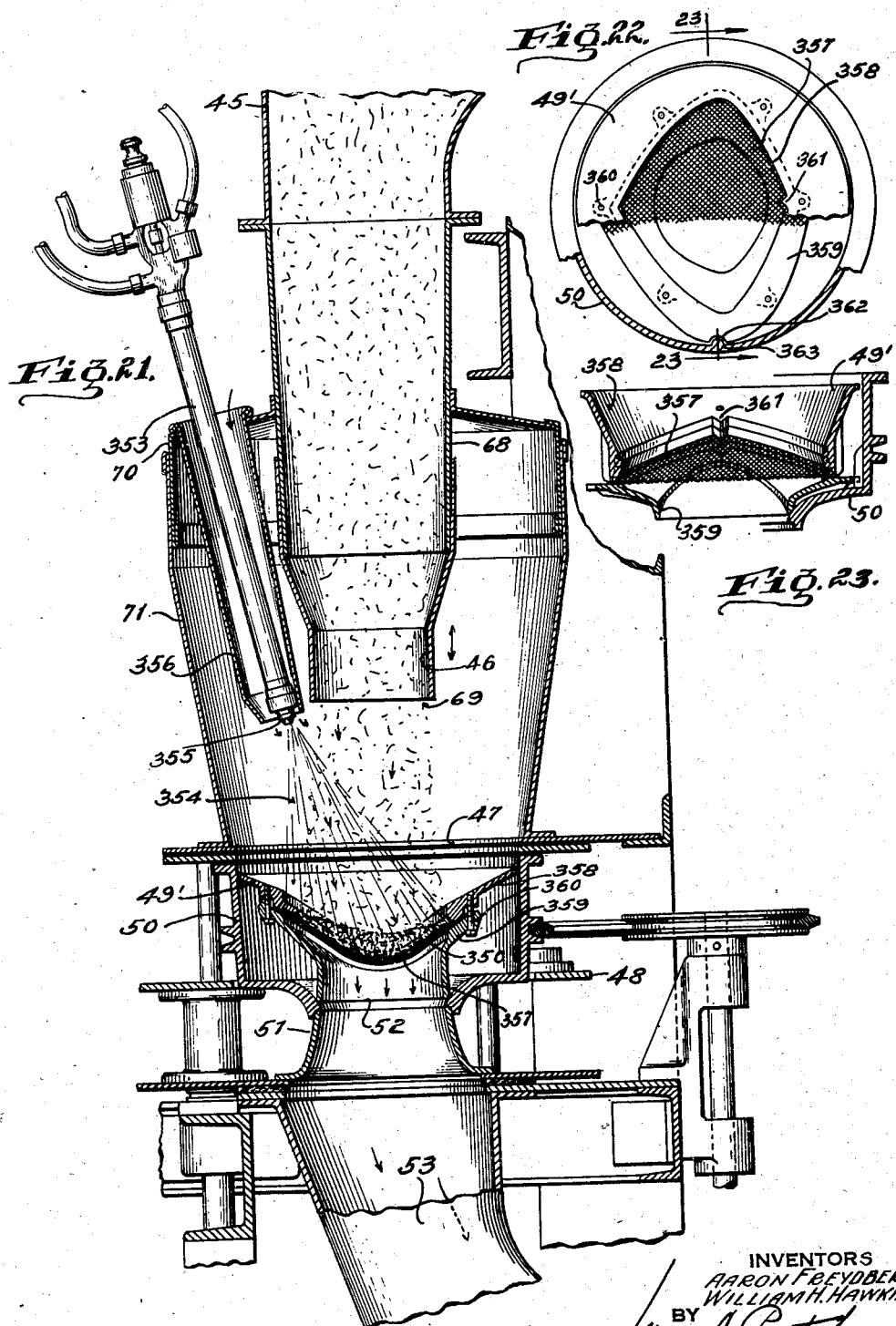

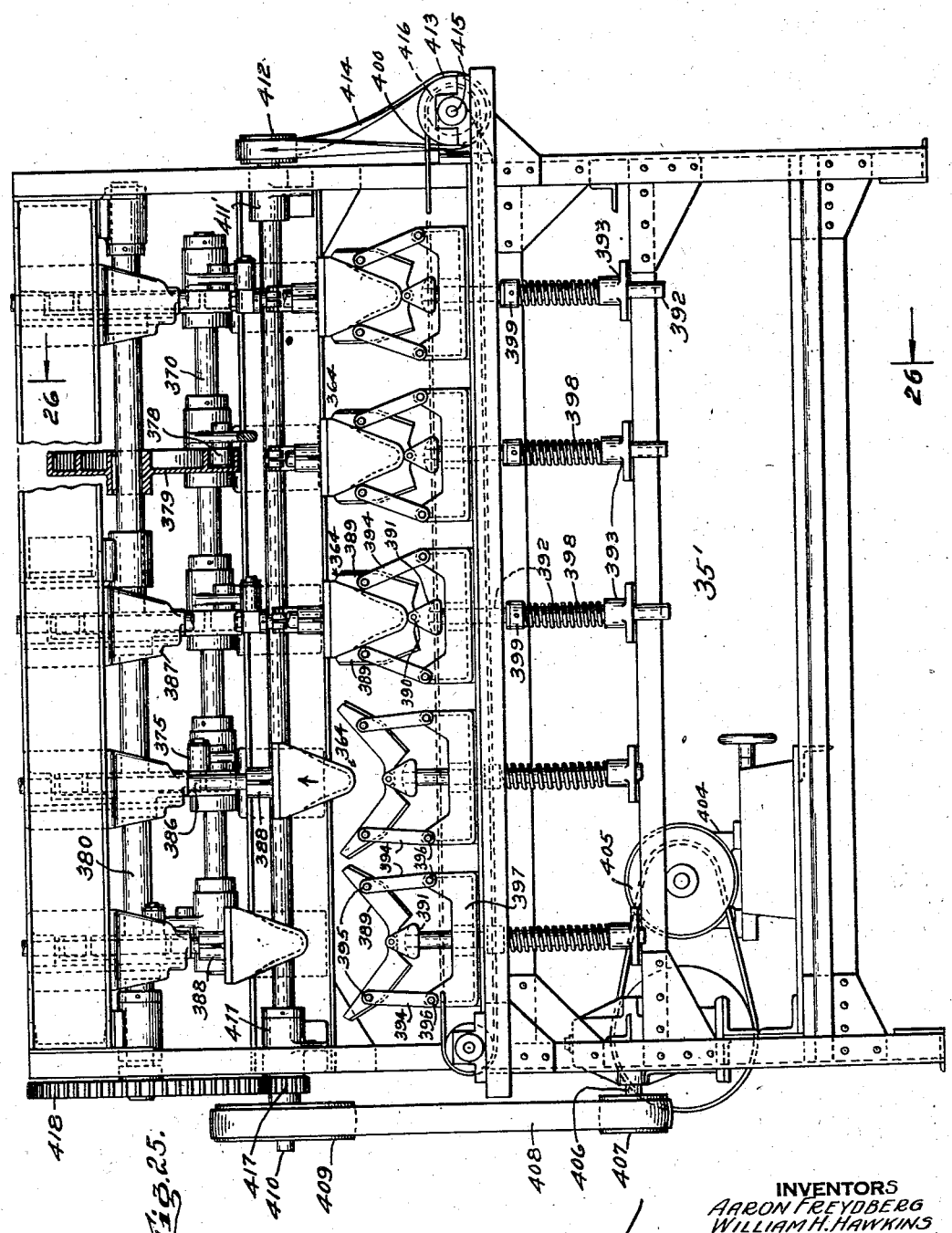

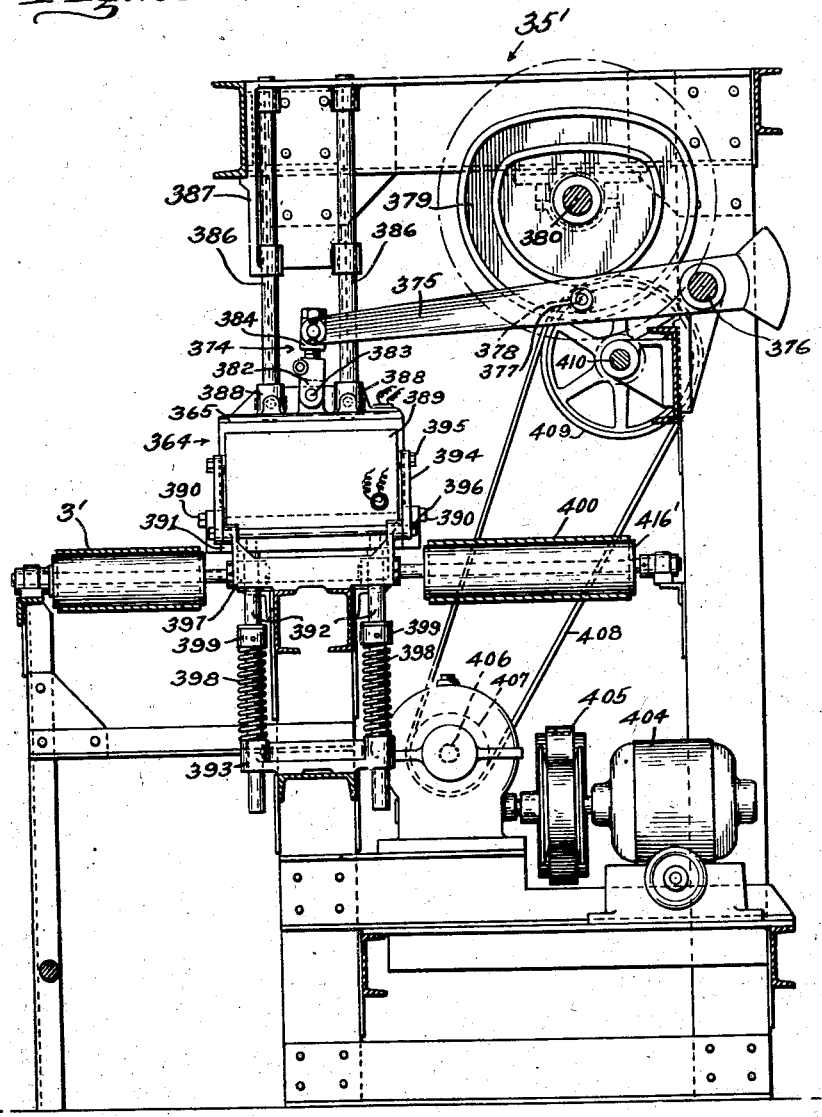

Patented Mar. 25, 1941

2,236,472

UNITED STATES PATENT OFFICE 2,236,472

METHOD AND APPARATUS FOR MAKING SHOULDER PADS

Aaron Freydberg, Mount Vernon, and William H. Hawkins, Brooklyn, N. Y., assignors to Freydberg Bros., Inc., Stamford, Conn., a corporation of New York Application October 20, 1937, Serial No. 170,008

20 Claims. (Cl. 154—2)

This invention is a continuation-in-part of application Serial No. 66,208, filed February 28, 1936, which is a continuation-in-part of application Serial No. 18,240, filed April 25, 1935, and relates to shoulder pads and a method of and apparatus for making shoulder pads, particularly shoulder pads such as used by tailors and clothing manufacturers in building up shoulders of coats.

To meet the requirements and give the best results in use, shoulder pads of the class described should be relatively thick at the central zone along one edge and should taper off gradually and uniformly toward the other or outer edges, which latter should be relatively thin.

Prior to this invention, one of the common procedures for making shoulder pads involved dieing out disks or layers of cotton batting from usually a web consisting of carded fibers. If the disk were of the necessary thickness for the pad, it was then subjected to a skiving operation, whereby the disk was made relatively thick at the central zone along one edge, tapering off gradually toward its other or outer edges. If the died disk were of a thickness insufficient to produce the desired thickness in the finished pad, several of the disks were superposed prior to the skiving operation. In many instances these pads were secured by lines of stitching to provide a pad of proper shape. These pads were relatively costly to manufacture because the different sized disks or layers had to be died out of sheets of batting before they were assembled by sewing or otherwise attached, thus requiring a considerable investment in dies. In addition, the labor cost in the die-cutting operation as well as the operation of assembling the cut disks or layers was considerable. Moreover, the finished pads were not satisfactory because, owing to the superposed disk or layer arrangement, the upper surface of the pad did not always present a continuous, smooth surface from its zone of greatest thickness toward its outer and thinner edges.

It is, therefore, an object of this invention to provide shoulder pads which are properly and uniformly shaped and constructed to meet the requirements of the most exacting tailor.

Another object is to provide an apparatus for and method of constructing or preparing, at a relatively low cost and without the employment of extensive cutting dies with their attendant labor complications, shoulder pads which are properly and uniformly shaped and constructed to meet the requirement of the most exacting tailors.

Another purpose is to provide a machine which is sufficiently flexible in operation to permit blanks to be made therein in various sizes, shapes and contours, as may be required in the trade.

Another purpose is to provide a machine for making preformed shoulder pads.

Various other objects and advantages will be apparent as the nature of the invention is more fully disclosed.

According to the present invention, we build up a shoulder pad of predetermined shape and size from individual cotton or wool fibers which are showered under air pressure or suction upon a foraminous support, such as a wire screen, so that the separate fibers will become interconnected, matted or felted with one another to provide an interconnected, matted or felted mass wherein the fibers in the central zone of the blank are more numerous and more densely compacted than those at the edge of the blank. The density of the blank thus formed gradually decreases outwardly, the upper surface being rounded or convex and tapering off smoothly and uniformly in all directions from its center toward its outer edges. The blank, after it has been formed as described, is then preferably compressed, as by passing it between a pair of rollers, at least one being composed of rubber or other soft material, whereby the entrapped air is removed and the blank is brought to more nearly the proper thickness and compactness. Since at least one roller is soft and yieldable, the general shape in cross-section of the blank will not be altered during the compressing operation. The fibers of the blank will be materially compressed or compacted, thus further increasing the density thereof, especially at its central zone where the blank is thicker and the fibers more numerous. The blank is now sufficiently strong to permit it to be readily handled and used for making shoulder pads therefrom. It is preferably made of a size to form two shoulder pads, in which case it may be severed along the proper axis to form the two completed pads.

In some instances a facing of suitable fabric, such as muslin, may be applied to one or both surfaces of the blank and may be secured by stitching to further strengthen the blank and hold the component parts together.

In other instances the blank may be coated on one or both sides with a liquid coating material, such as starch, a gum solution or other binding material. In order to further compress the blank and set the fibers as well as the coatings, the blank may then be baked in an appropriately shaped heated mold, the confronting faces of which are shaped to correspond to the shape and contour of the blank. By subjecting the coated blank to a combined heating or baking and pressing operation, the coating will permanently set, the outermost fibers forming a relatively thin skin thereover. This, however, will not interfere with the flexibility of the blank. A fabric facing may also be applied before or after coating with the liquid coating material if a further covering is desired.

In another embodiment of the invention the shoulder pad blank is built up by showering individual fibers under air pressure or suction, as previously described, upon a backing material, such as muslin or other fabric, positioned upon the foraminous support, thus producing in situ a shoulder pad blank having a backing or facing on one surface thereof. When this embodiment is used, the surface of the blank opposite that having the backing or facing is preferably coated with an appropriate composition which will set, preferably upon heating and pressing, to form a relatively thin skin thereover.

If desired, in either of the procedures of building up the blank previously mentioned, the fibers during the showering thereof may be sprayed with a liquid composition, such as a starch solution, a gum solution, a sodium silicate solution or the like, whereby a stronger product is obtained. Due to the components of the solution and/or the quantity thereof applied to the fibers, the flexibility and other desirable properties of the blank are not impaired. This procedure is admirably suitable for that embodiment of the invention which showers the fibers on to a backing, since it causes the fibers to adhere thereto.

Although the novel features which are characteristic of this invention will be more particularly pointed out in the appended claims, the broader aspects of the invention will be better understood from the following description, taken in connection with the accompanying drawings in which a preferred embodiment is set forth for purposes of illustration.

Referring now to the drawings:

Figure 1 is a diagrammatic view illustrating one process for producing shoulder pad blanks in accordance with the principles of this invention.

Figure 2 is a similar view illustrating a modification of the process wherein both surfaces of the blank are given the size coating.

Figure 3 is a front elevation of the apparatus for forming the blank of interconnected, matted or felted fibers.

Figure 4 is a section taken on lines 4—4 of Figure 3.

Figure 5 is a perspective view of one type of form which can be used in accordance with the principles of this invention.

Figure 6 is a top plan view of another type of form which can be used in accordance with the principles of this invention.

Figure 7 is a horizontal section taken on lines 7—7 of Figure 3.

Figure 8 is a vertical section taken on lines 8—8 of Figure 7.

Figure 9 is a front elevation of the mechanism for removing the blanks from the form.

Figure 10 is a detail view of the driving mechanism for the turret.

Figure 11 is a section taken on the line 11—11 of Figure 10.

Figure 12 is a detail view of the driving mechanism for the feed rolls and conveyor apron.

Figure 14 is a broken plan view of the baking mechanism of Figure 13.

Figure 15 is a perspective view of a modified form of baking mold.

Figure 18 is a perspective view of a pad made in accordance with the principles of this invention when the baking mold illustrated in Figure 13 is utilized.

Figure 19 is a perspective view of a pad made in accordance with the principles of this invention when the baking mold illustrated in Figures 15, 16 and 17 are utilized.

Figure 20 is another diagrammatic view illustrating a process for producing shoulder pads in accordance with the principles of this invention.

Figure 21 is a section illustrating that embodiment of the invention which contemplates spraying the fibers during the showering thereof.

Figure 22 is a plan view partly in section of another type of form which can be used.

Figure 23 is a section taken on lines 23—23 of Figure 22.

Figure 24 is a section of a blank formed in the apparatus illustrated in Figure 20.

Figure 25 is a side elevation of a baking mechanism of Figure 24.

Figure 26 is a section taken on lines 26—26 of Figure 25.

Figure 27 is a vertical section of the baking molds or forms.

Figure 28 is a perspective view of a shoulder pad blank produced by the apparatus shown in Figure 24.

Figure 29 is a section taken on lines 29—29 of Figure 28 and illustrates the finished shoulder pad.

Figure 13:
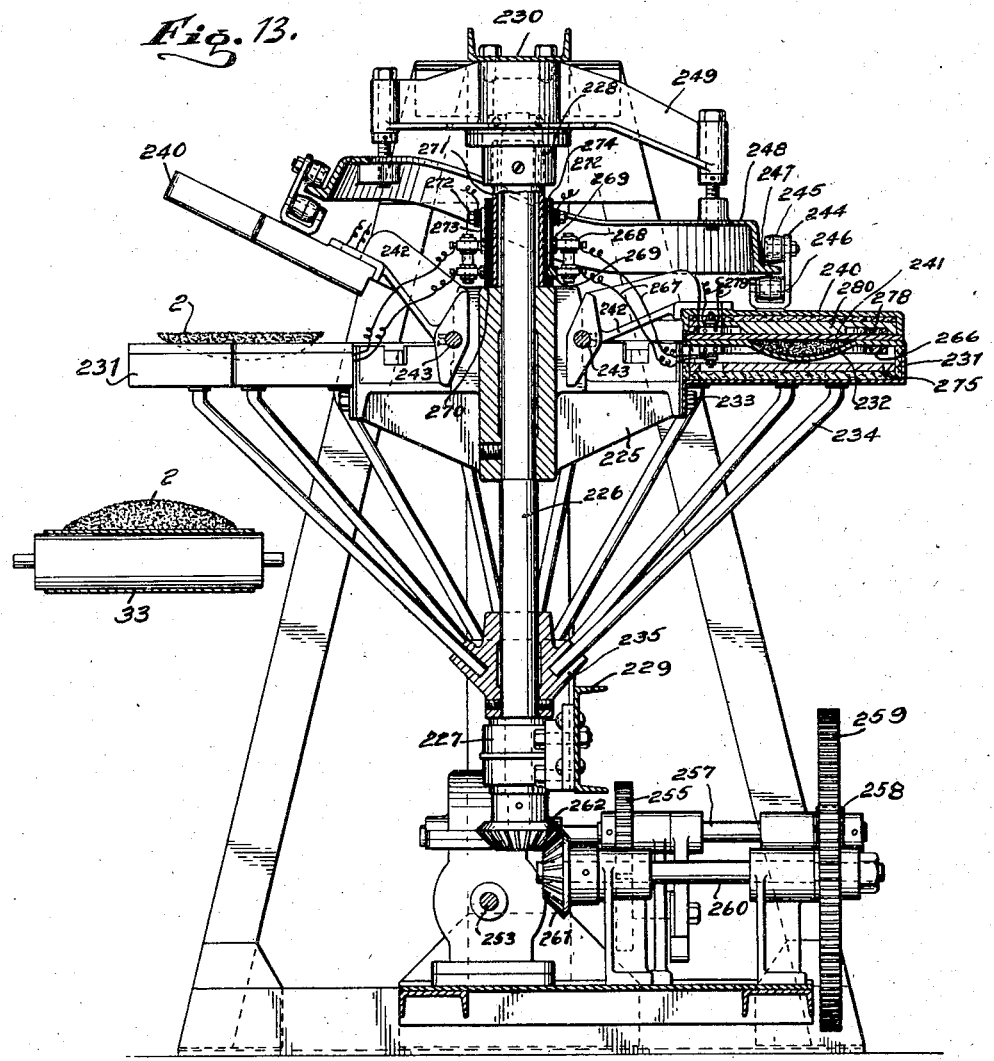
Figure 13 is a vertical section of one form of the baking mechanism.

In the following description and in the claims certain specific terms have been used for convenience in referring to the various details of the invention. It is to be understood, however, that these terms are to be given as broad an interpretation as the state of the art will permit.

Referring more particularly to the drawings, Figure 1 illustrates a mechanism for carrying on the complete process for making shoulder pad blanks. In this figure, the numeral 1 indicates a machine for making the blanks 2 composed of fibers interconnected, matted or felted together to form a mass with the fibers at the center zone more numerous and more densely compacted than those at the edges and having a substantially flat bottom surface 9 and a rounded or convex top surface 20, as more fully described hereinafter. These blanks are filled with entrapped air and are, therefore, somewhat expanded or puffed. They are deposited by the machine 1 on a conveyor belt 3 and passed thereby between presser rolls 4 and 5 by which the entrapped air is removed and the blank is compressed or compacted. The presser roll 4 may be made of some hard material, such as metal. The cooperating roll 5 may be made of some yieldable material, such as rubber. A belt 6 may be passed around the roll 5 and around an idler roll 7. This belt serves to prevent direct contact of the roll 5 with the blank 2 and thereby prevents the fibers from adhering to the soft rubber surface of the roll 5. The belt 6 may be made of any suitable belting material having a surface sufficiently hard for this purpose and yet flexible enough to permit the belt to conform to the contour of the upper surface of the blank.

The blank may now be handled or may be used for making shoulder pads therefrom. It may also have a facing of suitable fabric, such as muslin, applied thereto and secured, as by cross-stitching.

If a baked skin coating is required, the blank 2, after being compressed by the rolls 4 and 5, is transferred from the conveyor belt 3 onto a conveyor belt 8 in such manner that the blank is inverted on the conveyor belt 8, thereby exposing the flat surface 9 of the blank to a spray 10 which is derived from a suitable spray gun 11, such as a Norris painting machine. Though an appropriate transfer mechanism may be used in the embodiment shown, the blank 2 is dropped from the end of the conveyor belt 3 and falls onto the conveyor belt 8 in an inverted position. The spray 10 may comprise any suitable liquid coating material, such as starch, a gummy material or other binding material which has the characteristics of quickly hardening or becoming set under the influence of heat and pressure. The liquid may be applied hot, if desired. This coating provides a flexible protecting skin or facing for the blank which prevents derangement of the fibers and facilitates the handling of the blank. If desired, a fabric facing sheet (not shown) may be applied to one or both surfaces of the blank, either before or after the liquid coating material is applied, and may be secured thereto in the subsequent baking step. It is contemplated, however, that the protecting skin formed by the liquid coating material will be sufficient to hold the fibers during the subsequent handling and shipment of the blank.

The coated blank is deposited by the conveyor belt 8 onto a conveyor belt 12 which passes around a heated drier 13, comprising a drum 14 having, for example, a plurality of electrical heating units 15 disposed therein. The conveyor belt 12 is so disposed about suitable idler rolls 16 that the coated surface 9 of the blank 2 is held against the heated drum 14 and the conveyor belt 12 holds the blank under suitable pressure to impart the desired characteristics to the protecting skin or facing. The blanks are discharged from the drier 13 and are fed by the conveyor belt 18 onto a suitable conveyor or feed 19 by which they are taken to a place where they are severed to form a pair of shoulder pads.

It is, of course, obvious that the process has been described in a more or less diagrammatic fashion and that various mechanical changes may be made therein as will occur to a person skilled in the art.

A modified process illustrating a further embodiment of the invention is shown in Figure 2. In this process the blanks 2 are made by the machine 1 and deposited on the conveyor belt 3 in the manner set forth in connection with Figure 1. After being passed between presser rolls 4 and 5, the blanks 2 are fed onto a conveyor 25 which may comprise an open mesh wire belt. This belt feeds the blanks 2 under a spray 10 which is derived from a suitable spray gun 11 similar to that described above and by which the top or rounded surface 26 of the blanks may be coated. The other surface 9 may be coated either by a second spray gun 27, positioned below the open mesh wire belt 25, to direct a spray 28 upwardly therethrough or the blanks may be inverted and fed under a third spray gun 31 which directs a spray 32 onto the flat surface 9. In the embodiment shown, the conveyor 25 is passed around a pair of idler pulleys 29 in such manner that the blank is transferred to a section 30 of the conveyor in an inverted position. Any other suitable means for inverting the blank may be used if desired.

After receiving the coating on both sides, the blank is deposited onto a conveyor belt 33 which may be disposed beneath the discharge end of the belt 25 in such manner that the blanks are again inverted and are deposited on the belt 33 with the flat side 9 in contact with the belt. A sump 34 is disposed under the belt 25 and the various spray guns 11, 27 and 31 so as to receive any excess coating material which passes through or drips from the belt or from the blank. The blanks 2 are fed by the conveyor 33 to a baking machine 35, the details of construction of which will be hereinafter more fully described in connection with Figures 13 and 14.

The operation of the process of Figure 2 is similar to the process of Figure 1 with the exception that the blank 2 is coated on both sides with the protecting skin or facing. It is obvious that the process is not limited to the use of any particular type of mechanism at the various stages thereof. Furthermore, the various steps of the process may be arranged in other sequences. For example, the coating may be entirely omitted in some instances or the blank may be severed to form the two shoulder pads before the coatings are applied. The process is sufficiently flexible to permit blanks to be made in the various forms and types required in the trade.

Another modified process illustrating another embodiment of the invention is shown in Figure 20. In this embodiment the machine 1' produces a blank 2' composed of sized fibers interconnected, matted or felted together to produce a mass with the fibers at the center zone more numerous and more densely compacted than at the edges, the bottom surface being faced with a suitable fabric 350, such as muslin. The blanks 2' are deposited by the machine 1' on a conveyor 3' with the surface 351 exposed and conducted to a spray gun 11' to which is derived from a suitable spray gun 11' to provide the surface 351 of the blank 2' with a thin flexible protecting skin or surface 352, as in the case of the previously described embodiment. If desired, a sump (not shown) may be provided at an appropriate place beneath the gun 11' to receive any excess spray material.

The spray and size for the fibers may comprise any suitable composition, such as a starch solution, a casein solution, a gum solution, a sodium silicate solution or other sizing or coating compositions which have the characteristics of quickly hardening or becoming set under heat or pressure.

The blank 2' is then fed by the conveyor 3' to a baking or forming machine 35', the details of construction of which will be hereafter more fully described in connection with Figures 25, 26 and 27.

The machine 1 for making the blanks is shown more in detail in Figures 3 to 12. Referring first to Figures 3 to 7, it will be noted that the machine is adapted to receive a roll 38 of cotton batting or similar loosely matted fibrous material which serves as the source of fibers for making the blanks. The roll 38 is held in a trough 39 and rests upon a conveyor apron 40 by which the batting is conveyed to a pair of feed rolls 41 and 42. These feed rolls 41 and 42 feed the batting against the face of a picker roll 43 which is rotating at high speed and which pulls apart or picks the individual fibers from the batting and deposits them in a hopper 44.

The hopper 44 connects with a pair of chutes 45, each terminating in a throat which feeds the individual fibers through an opening 47 in a turret 48 onto a form 49 held in a rotating frame 50. Beneath each opening 47 is disposed a tube 51 which, in conjunction with the lower part of the frame 50, provides a Venturi-shaped opening 52 through which passes the air which is used for conveying and depositing fibers on the form 49.

The opening 52 is so shaped that a greater suction or pressure and a higher air velocity (hereinafter and in the claims defined as "increasing the air velocity") are obtained at the center of the form 49 than at the edges thereof, the construction of the opening 52 below the form 49 serving to deflect the air away from the edges. The contour of the opening 52 may be varied so as to obtain any desired distribution across the form.

A duct 53, which leads to a main duct 54 connected to a suction blower 55 of any convenient type, is disposed beneath each turret 48 in communication with a selected tube 51. The suction blower 55 may be operated by a belt 56 engaging a pulley 57 secured to the blower shaft 58 and driven by any suitable source of power (not shown). The suction blower 55 may be provided with a discharge duct 59 which leads to the atmosphere or to a recovery apparatus, as may be required.

In the embodiment shown, a pair of chutes are provided which cooperate respectively with a pair of turrets 48. It is evident, however, that any number of such chutes and turrets may be incorporated in a single machine or that the machine may have only one such chute and turret.

Each turret 48 is provided with a plurality of openings 47 adapted to receive the frames 50. In the embodiment shown in Figure 7, three such openings are formed in each turret. The turrets, however, may have other numbers of openings, such as two or four, if desired. The turrets are driven step-by-step so that a frame 50 is held under the chute 45 a sufficient length of time to receive the necessary fibers for making the blank. Thereafter, the turret is stepped around to a position which brings the frame 50 with the blank therein under a suction cup 60 and brings a second frame 50 under the chute 45 for receiving the fibers to make a second blank. A suction cup 60 cooperates with each turret 48. Each suction cup is adapted to lift the blank from the form 49 and to deposit the same onto the conveyor belt 3 which feeds the same for further treatment in accordance with the process described in Figure 1 or 2.

The hopper 44 is provided with an opening 65 which may be closed by an adjustable slide 66 to control the amount of air which is drawn in. A baffle 67 is mounted adjacent the picker roll 43 to deflect the fibers and to prevent the fibers from being carried around by the picker roll. A shield 64 may be disposed around the picker roll 43 to close the hopper 44 and to prevent the fibers from being thrown out of the machine.

The throat 46 associated with each chute 45 is slidably mounted on the end 68 of the chute and is adapted to be raised or lowered with respect thereto so as to bring its discharge opening 69 in proper position with respect to the form 49 for depositing the fibers thereon in the required manner.

The throat may thus be raised or lowered in accordance with the size of the form 49, a higher throat permitting the discharged fibers to spread over a greater area and vice versa. The throat is preferably made with an area less than that of the form so as to concentrate the fibers at the center of the form. The vertical adjustment of the throat, in cooperation with the Venturi-shaped opening 52, thus controls the distribution of the fibers over the form. The fibers are, for example, concentrated more toward the center of the form as the distance from the throat to the form is decreased.

The lower part of each chute 45 may be closed by a casing 70 having a closure 71 slidably mounted at the lower part thereof and adapted to engage a cover plate 72 which lies closely above the turret 48 and has an opening 73 registering with the particular opening 47 of the turret which is in fiber-receiving position. The closure 71, however, is adapted to be telescoped over the casing 70 so as to afford access to the throat 46 of the chute 45, whereby the throat may be manually adjusted for the purpose specified. The casing 70 and closure 71 prevent drafts from interfering with the deposition of fibers on the form 49 and also provide a tight seal which assits in maintaining the proper flow of air through the chute 45.

The form 49 may have an open mesh bottom 75 (Figure 5) and a side-shaping ring 76 which is secured thereto and has an opening 77 therein of a shape corresponding to that of the desired blank. The shaping-ring 76 is provided with a pair of bosses 78 which form recesses 79 (Figure 18) in the blank. These recesses serve as guides for cutting the blanks to make the two shoulder pads therefrom. The bosses 78 may be omitted if such recesses are not desired in any particular instance or may be varied in size and shape to provide any desired contour.

Two types of forms are shown in Figures 5 and 6 respectively. It will be noted that these forms differ merely in the shape of the opening 77 which in Figure 5 is heart-shaped and in Figure 6 is diamond-shaped. In Figure 6 only one boss 78 is provided and the blank is severed on a line passing through the recess 79, thus formed, and the opposite point of the blank.

These particular forms are representative only. It is obvious that the form may be made in any shape which is best adapted to suit the requirements of the different clothing manufacturers or tailors. The machine is thus adapted to supply various sizes and shapes of blanks as may be required in the trade.

In the operation of the portion of the machine thus far described, the fibers which are separated or liberated from the roll of batting 38 are picked up by the air current which is drawn through the hopper 44 by the suction blower 55, and are deposited on the open mesh bottom 75 of the form 49. The Venturi-shaped opening 52 is adapted to cooperate with the throat 46 of the chute 45 in the manner described above to provide a stronger air current at the center of the form 49 than at the periphery thereof. Due to the increased pressure or suction at the central zone above-mentioned, not only will a greater amount of fibers be deposited at said zone, but the fibers will also be more densely compacted than at the edges of the form. The blank is accordingly built up with an arched, convex upper surface 26 and with a substantially flat lower surface 9 and with the fibers closely interconnected, matted or felted together.

The frame 50 is rotated while the fibers are being delivered so that the fibers are more evenly distributed and are caused to be uniformly laid and intimately interconnected, matted or felted together throughout the thickness of the blank as it is built up. The fibers are thus laid in a grainless, non-stratifying, interconnecting mass of variable density and thickness and having no continuity or grain in any particular direction. Obviously, the thickness of the built-up blank will depend on the fibrous material delivered upon the form 49 and thus may be regulated to suit different requirements by changing the rate of feed of the cotton batting, the speed of rotation of the picker roll, the suction or pressure created by the suction blower 55, the contour of the throat 46 and of the opening 52 beneath the form, and the time during which the form is exposed to the fibers.

It will be noted that this blank will be considerably puffed by the entrapped air and that, in order to remove this entrapped air and to bring the blank more nearly to the proper thickness and compactness, it is compressed by the presser rolls 4 and 5 above-mentioned (Figures 1 and 2).

Referring now to Figures 3, 4, 7, 10 and 12, it will be noted that the conveyor apron 40 is mounted upon a driving roll 84 and an idler roll 85. The conveyor apron may be formed with a plurality of transverse slats 86 which extend across the face of the apron and provide the necessary support for the cotton batting. This apron is used inasmuch as the cotton batting has practically no tensile strength and must be supported and fed throughout its entire width. The roll 38 rests on the apron 40 and the trough 39 and unrolls as the batting is fed by the apron 40.

The driving mechanism for the apron 40 and for the feed rolls 41 and 42 comprises a motor 87 having a sprocket 88 connected by a chain 89 to a driving sprocket 90 which is mounted upon a main drive shaft 91. The main drive shaft 91 extends across the machine and is provided at the end opposite the sprocket 90 with a worm gear 92 engaging a worm wheel 93 which is loosely journaled on a vertical drive shaft 94. The vertical drive shaft 94 is supported by a suitable thrust bearing 95 (Figure 4) and has associated therewith a notched clutch member 96 adapted to cooperate with a similar notched clutch member 97 which is carried by a collar 98 pinned to the vertical drive shaft 94. The collar 98 is engaged by a yoke 99 actuated by a lever 100 for causing longitudinal movement of the collar with respect to the vertical drive shaft 94, the arrangement being such that, when the clutch members 96 and 97 are engaged, power is transmitted from the worm wheel 93 to the vertical drive shaft 94 and, when said clutch members are disengaged, the worm wheel 93 is free to rotate about said shaft 94 which thereupon remains stationary.

The vertical drive shaft 94 carries at its upper end a bevel gear 106 engaging a bevel gear 107 carried by a drive shaft 108. The drive shaft 108 extends across the machine and carries at its opposite end a pinion 109 meshing with a spur gear 110 carried by an idler shaft 111. The idler shaft 111 extends across the machine and carries a gear 112 meshing with an idler gear 113 which in turn meshes with a gear 114 mounted on a shaft 115 carrying the driving roll 84 for the apron 40.

The drive shaft 108 also carries a pinion 118 meshing with a gear 119 carried upon a shaft 120 on which the lower feed roll 41 is mounted. The upper feed roll 42 is mounted on a shaft 121 having a gear 122 which meshes with the spur gear 110 above-mentioned, the spur gear 110 in this instance operating as an idler to transmit power from the pinion 109 to the gear 122. It is to be understood that the various shafts and gears above mentioned are mounted in suitable bearings which are supported, for example, on an inclined bracket 123 carried by a frame 124 of the machine.

The picker roll 43 must rotate at an extremely high rate of speed. Consequently, it is driven by a belt 125 engaging a pulley 126 carried on a shaft 127 on which the picker roll 43 is mounted, said belt 125 being driven by any suitable source of power (not shown).

Each turret 48 is formed with three plates 130, 131 and 132 secured together by tie rods 128 and mounted upon a shaft 133 which is journaled in a bearing 134 and is intermittently driven by suitable mechanism to be described. The plate 130 carries the three openings 47 above described. Three frames 50 are mounted in corresponding apertures 135 in the plate 131 and are seated on sets of flanged rollers 136 which provide both a support and a bearing for the frames. It is to be noted that each frame 50, due to the construction thereof as shown in Figure 4, has a restricted bottom opening. The bottom part of each frame 50 registers with a tube 51, above mentioned, which is supported over an aperture 138 in the plate 132. The tubes 51 may be secured to the frames 50 for rotation therewith or may be carried by the plate 132, in which case the frames 50 may rotate about the ends of said tubes. The openings 47 in the plate 130 are of such dimension that the form 49 can be lifted therethrough for purposes of renewal or replacement.

It is to be understood that the specific construction of the turrets and the supporting means for the rotating frames may be varied, and also that any desired number of frames may be held in each turret. A specific construction has been set forth only by way of illustration.

A belt channel 137 is formed on the outer surface of each frame 50, and, when the frame is in fiber-receiving position, engages a belt 140 (Figure 7) by which the frame is rotated. The belt 140 is carried on a driving pulley 141 and idler pulleys 142 in such position that the belt channels 137 in the frames 50 are caused to bear against and engage the belt 140 when the respective frames are brought into or are in fiber-receiving position. The driving pulley 141 is mounted upon a shaft 143 carrying a bevel gear 144 engaging a similar bevel gear 145 mounted upon the main drive shaft 91 (Figures 3, 7 and 10). Certain of the idler pulleys 142 may be slidably mounted on a frame 146 so that the tension of the belt 140 may be adjusted as desired.

The belt 140 extends over a substantial chord of the turrets 48 so as to engage the channel 137 of the frame 50 as long as any portion of the frame is in fiber-receiving position, that is, while the frame is being moved to and from the fiber-receiving position. This prevents deposition of any fibers while the frame is stationary and ensures an even distribution of the fibers over the form 49.

The mechanism for intermittently driving the turrets 48 comprises a drive shaft 150 having a belt pulley 151 engaging a belt 152 which is driven by a pulley 153 mounted on the main drive shaft 91. The shaft 150 carries a gear 154 meshing with a gear 155 mounted upon a shaft 156 on a change speed mechanism 157. The second shaft 158 of said mechanism carries a pinion 159 driving a gear 160 mounted on a shaft 161.

The change speed mechanism 157 may be of any standard construction and in the embodiment shown comprises a pair of opposed cones 162 slidably mounted upon the shaft 156 and a similar pair of cones 163 mounted upon the shaft 158. The cones 162 and 163 engage a V-belt 164, the effective diameter of the cones depending upon their relative position with respect to said belt. The cones 162 and 163 are adjusted in opposite directions by levers 165 connected to a threaded shaft 166 which is actuated by a hand wheel 167, the arrangement being such that one pair of cones, for example the cones 162, is brought closer together, while the opposite pair of cones 163 is spread apart, thereby changing the effective diameters of the two cones and, consequently, the driving ratio between the shafts 156 and 158. The change speed mechanism above described is of standard construction and has accordingly not been set forth in detail.

An indicator 168 may be actuated from the threaded shaft 166 to indicate the condition of adjustment of the change speed mechanism 157.

The shaft 161 carries an arm 170 having a lug 171 formed thereon which is adapted to intermittently release a one-revolution clutch, to be described, which establishes a driving connection between a turret drive shaft 172 and a gear 173 which is loosely mounted on said shaft and engages a pinion 174 mounted on the drive shaft 150 above mentioned. The turret drive shaft 172 carries beveled gears 175 meshing with beveled gears 176 carried upon the turret shafts 133.

The one-revolution clutch by which the intermittent drive of each turret shaft 133 is obtained comprises a flanged disk 177 having a flange 178 which is mounted on and secured to the gear 173 and loosely rotates with said gear on the shaft 172. A second disk 169 is fixed to the shaft 172 and is provided with a hub 179 having a notch 180 (Figure 11) in which the tapered end 181 of a feed dog 182 rests. The feed dog 182 is provided with a groove 183 through which the flange 178 of the flanged disk 177 passes. The groove 183 is formed at an angle to the transverse axis of the feed dog 182 so that, when the feed dog is pressed in one direction by means of a spring 184 seated between said dog and a lug 185 formed on the disk 169, the groove 183 securely grips the flange 178 and establishes a driving connection between the flanged disk 177 and the shaft 172, thereby completing the driving connection from the drive shaft 150, through the gear 173 and pinion 174, to the shaft 172 for driving the turrets. When the feed dog 182 is pivoted about its tapered end 181 in a direction to compress the spring 184, the feed dog releases the flanged disk 177 and permits the flange 178 to freely rotate within the groove 183.

For thus operating the feed dog, a stop member 190 is provided, having an arm 191 normally held by a spring 192 in such position that the stop 190 is in alignment with the feed dog 182. The stop 190 is mounted upon a shaft 193 which carries an arm 194 adapted to be engaged by the lug 171 formed on the arm 170 above-mentioned. The arrangement is such that, when the lug 171 engages the arm 194, the stop 190 is rocked to a position indicated in dotted lines in Figure 11, which is out of alignment with the feed dog 182. The feed dog is thereupon released by the stop member 190 and is caused by the action of the spring 184 to grip the flange 178 for the purpose above-mentioned.

It will be noted that because of the eccentric arrangement of the shafts 161 and 193, the lug 171 engages the arm 194 to lift the same, but slides past the end of said arm after the same has been lifted the desired amount, thereby permitting the arm 170 to continue its rotation. The stop 190 is moved into release position a sufficient length of time to permit the feed dog to pass the same. It is then immediately returned, due to the lug 171 sliding past the end of the arm 194, and again takes a position to engage the feed dog 182 after the feed dog and associated clutch mechanism have made one revolution. It is evident, therefore, that on each actuation of the release mechanism, the shaft 172 is caused to make one revolution. The gear ratio is such that one revolution of the shaft 172 serves to feed the turret 48 a distance adapted to remove one frame 50 from fiber-receiving position into position beneath the suction cup 60 and to feed a second frame into fiber-receiving position. In the embodiment shown, this constitutes a turret revolution of 120°. It is obvious, however, that the number of frames 50 carried by the turret may be varied and that the amount of turret movement will be correspondingly changed.

Each suction cap 60 is connected by a hollow arm 200 to a sleeve 201 journaled on a tube 202 leading to a duct 203 (Figures 7, 8 and 9) which communicates through a valve 204 with an exhaust duct 205 leading to a separate suction blower (not shown) or connecting if desired to the suction blower 55. The valve 204 constitutes a cylindrical housing 206 having a cylindrical valve member 207 therein which is rotatably mounted on the shaft 161, the operation of which has been described above. The cylindrical valve member 207 is provided with an opening 208 which is adapted to establish communication between the duct 203 and the exhaust duct 205 during a part of the revolution of the shaft 161 and interrupt the connection between said ducts during the remainder of each revolution of said shaft, whereby suction is intermittently applied to the suction cups 60 for the purpose to be set forth.

The suction cups 60 are oscillated by mechanism including intermeshing gear wheels 210 which are connected to the respective sleeves 201. One of the gear wheels 210 carries a beveled pinion 211 meshing with a pinion 212 mounted upon a shaft 213 carrying an arm 214. The arm 214 is connected by a link 215 to a lever 216 having a roller 217 bearing upon a cam 218 mounted upon the shaft 161. The arrangement is such that on each revolution of the shaft 161 the cam 218 causes the lever 216 to oscillate, thereby imparting oscillatory movement to the lever 214, and through the pinions 211 and 212, causing rotation of the gear wheels 210 which causes the suction cups 60 to swing from their position over the frames 50, as illustrated in full lines in Figure 7, to a discharge position over the conveyor belt 3, as indicated in dotted lines in said figure. The valve 204 is so timed with respect to the oscillatory movement of the suction cups 60 that suction is broken when the cups are swung to discharge position over the belt 3.

Each suction cup 60 is provided with a porous baffle 220 and is also provided with a flange 221 which is adapted to make close contact with the plate 72 so as to prevent leakage of air and to insure a sufficient amount of suction to lift the blank 2 from the form 49, as indicated in Figure 8. The blank 2 is then held against the porous baffle while the suction cup is swung into its discharge position over the conveyor belt 3. The suction is then broken by the valve 204 and permits the blank 2 to fall out of the suction cup 60 onto the conveyor belt 3.

It will be noted that the shaft 161 operates the release mechanism for causing intermittent rotation of the turrets 48. The operation of the suction cups is thus synchronized so that the suction cups are brought over the frame 50 and pick up the blank therefrom while the turret 48 is stationary and while the second frame 50 is in fiber-receiving position. The suction cups may be swung into discharge position while the turret 48 is stationary or while it is being stepped into its next position.

It will be noted that when three frames 50 are mounted in each turret, as indicated in Figure 7, one of the frames is always in an exposed position. This provides an opportunity for renewing or replacing the exposed form 49 without interrupting the operation of the machine.

In the preferred construction as shown, the air current for depositing the fibers is created by suction at a point beyond the forms. As an alternative construction, the air current may be produced by positive pressure created by a blower ahead of the forms, in which case the fibers are blown onto the form, the throats 46 being so designed as to produce the required distribution of fibers over the forms.

As a further modification, the forms can be held stationary in the turrets and a rotary motion imparted to the stream of fibers applied thereto.

The machine above-described operates to make the shoulder pad blanks rapidly and accurately. The blanks are sufficiently compacted to permit handling and are readily cut to form the two shoulder pads. The blanks may be compressed and coated on one or both surfaces with a suitable facing material which may comprise a fabric or a liquid coating and binding material as above-described. In some instances, one surface of the blank may have a fabric facing material and the other surface may have the size coating. When a liquid coating material is used, the blank is fed into a baking machine adapted to apply heat and pressure for a sufficient time to set or harden the coating material.

Referring now to the heating and baking machine indicated in general at 35 in Figure 2 and shown in detail in Figures 13 and 14, it will be noted that this machine comprises a rotating spider 225 mounted upon a shaft 226 journaled in bearings 227 and 228, which are supported by frame members 229 and 230 respectively. A plurality of boxes 231 carrying lower mold members 232, to be described, are secured to the spider 225, as by bolts 233, and are further supported by rods 234 extending between the bottom of each box 231 and a boss 235 secured to the shaft 226 adjacent the bearing 227. Movable boxes 240 carrying upper mold members 241, to be described, are secured to arms 242, pivoted by pins 243 to the spider 225 in such manner that the arms 242 are adapted to rock to permit the boxes 240 to be elevated away from the box 231, as indicated at the left of Figure 13. Each box 240 carries a bracket 244 provided with upper and lower rollers 245, 246, respectively, engaging a track 247 which is formed on a track member 248 carried by a stationary spider 249 mounted upon the frame 230 in any convenient manner. The track 247 is of such shape that the rollers 245, 246 hold the boxes 240 in position to close the mold member during a part of each revolution of the shaft 226, as indicated at the right side of Figure 13, and elevate the boxes 240 during the remainder of each revolution of the shaft 226 to open the mold for receiving and removing the blank therefrom, as indicated at the left side of Figure 13. The lower rollers 246 are in pressure engagement with the lower side of the track 247 when the mold is in closed position, thereby serving to exert the required pressure on the blank within said mold.

The shaft 226 is driven from a motor 252 having a shaft 253 carrying a pinion 254 and driving a gear 255 through an idler 256. The gear 255 is mounted upon a shaft 257 carrying a pinion 258, driving a gear 259 which is mounted upon a shaft 260 carrying a beveled gear 261 which meshes with a similar beveled gear 262 carried by the shaft 226.

Each of the lower mold members 232 is provided with a heating coil 266 which is connected by wires 267 to brushes 268 engaging slip rings 269 mounted by means of an insulating member 270 on a sleeve 271 which is secured to the bearing 228. Electrical connections are made to the slip rings 269 by terminals 272 connected by conducting strips 273 and 274 to the respective slip rings. The box 231 may be provided with suitable heat insulation 275 to conserve the heat and prevent the exterior surface from becoming unduly hot.

Each upper mold member 241 is provided with a heating coil 278 connected by leads 279 to the brushes 268, the connections being omitted from the drawings in order to clarify the showing. Each box 240 may be lined with heat-insulating material 280 for the same purpose as the heat-insulating material 275 above-mentioned.

It will be noted that the upper mold member 241 and the lower mold member 232 together form a mold cavity in which the blank 2, which has been coated on one or both sides by the coating material, is held under the influence of heat and pressure. The apparatus is so timed that heat and pressure are applied a length of time sufficient to bake the coating and to form the desired flexible protecting skin or facing on the blank.

When the blank is removed from the baking machine above-described, it is in finished condition and is in the form illustrated in Figure 18. This blank, however, is adapted to form two shoulder pads. Consequently, it is then cut or severed transversely along the line 282, passing through the recesses 79 to form two pads, one of which is shown in full lines at 283. It is obvious that the cut along the line 282 may be varied somewhat and may be made at an angle if desired, the entire purpose being to provide the necessary contour for the finished pad 283. The recesses 79 provide a convenient guide for the cutting operation.

It will be noted that his pad is thicker and denser at the center portion along the line 282 and tapers uniformly from that point to the edges of the pad. The pad, of course, may have cross-stitching, if desired, and may, if desired, have a fabric facing applied thereto in the manner previously pointed out. It is then ready for shipment and use.

In certain instances it may be desirable to perform the pad as shown in Figure 19. One advantage of preforming the pad in this manner resides in preventing the pad from wrinkling or gathering at its lower surface which may occur if the pad is made flat, as shown in Figure 18, and is subsequently bent to the curved section required for use in a garment.

Figure 17:
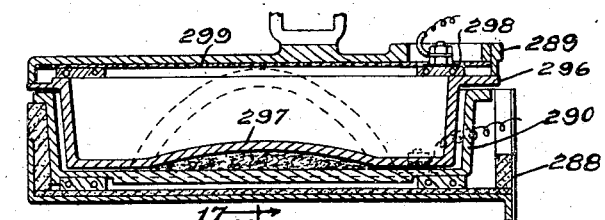
Figure 17 is a section taken on line 17—17 of Figure 16.
Figure 16:
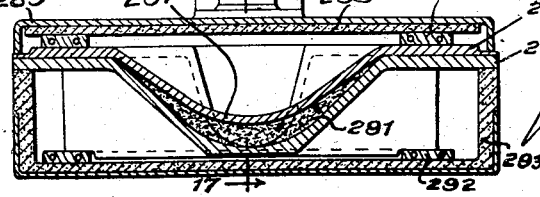
Figure 16 is a section of the baking mold shown in Figure 15 in the baking machine.

This preformed pad may be readily made in the above-described baking machine by using the modified mold illustrated in Figures 15 to 17. In this mold the boxes 288 and 289 correspond to the boxes 231 and 240 described above and are adapted to be secured in the baking machine in the same manner. In this embodiment, the lower mold member 290, which is mounted in the box 288, is formed with a central depressed portion 291 which is of a shape adapted to form the upper rounded surface of the finished pad. The portion 291 is in the general form of an ellipsoid of revolution, the exact shape being varied to suit the requirements. A heating coil 292 is provided for applying heat to the lower mold member 290 and a lining 293 of suitable heat insulation is provided in the box 288.

The upper mold member 296 is mounted in the box 289. This mold member has a central raised portion 297 which is adapted to enter the central depressed portion 291 of the lower mold member 290 and is shaped to conform to the inner surface of the preformed pad. A heating coil 298 is associated with the upper mold member 296 and the box 289 is lined with suitable heat-insulating material 299.

In the above embodiment, the upper and lower mold members 296 and 290, respectively, form a mold cavity therebetween which is adapted to compress and form the blank during the baking operation. When the pad is removed from this mold cavity, it may be severed along a transverse line 300 so as to divide the blank into two halves, each constituting a finished shoulder pad.

It will be noted that the pads made in this manner are preformed and are permanently held in the position in which they are to be used. Consequently, all hand-forming operations are eliminated and it is only necessary for the tailor to attach the pads to the garment. It is evident, therefore, that with the above-described process and mechanism the pads may be quickly and cheaply made with any desired finished contour. Furthermore, the mold may be readily changed so as to provide the necessary assortment of pads, such as, for example, pads having different shapes or sizes or the like, and the texture of the pad may likewise be varied by changing the raw material or the contour of the form or the condition under which the fibers are fed to the form.

While it has heretofore been customary to apply a fabric facing to at least one side of the blanks, it has been found that blanks made in accordance with the present invention do not usually require this facing inasmuch as they are sufficiently protected by the flexible protecting skin produced by spraying and baking the liquid coating material thereon.

As above explained, another embodiment of the invention contemplates forming the blanks of fibers which have been thinly coated or sized with any suitable composition, such as starch solution, a casein solution, a gum solution, a sodium silicate solution, or any other suitable sizing or coating composition. In accordance with this embodiment, the fibers are coated with the selected composition during the production of the blank. Preferably, the fibers, after leaving the throat of the chute and prior to or simultaneously with the collection thereof upon the form, are sprayed with the selected composition. To secure these results the apparatus illustrated in Figure 4 hereof is provided with a spray gun or other suitable spraying mechanism as hereafter more fully described.

Referring now to Figure 21, wherein is illustrated an apparatus for producing the blanks of sized fibers, the reference numeral 353 designates a spray gun or spray mechanism of any suitable construction. The spray mechanism 353 is adjustably mounted in any well-known manner so that a spray 354 may be applied to the fibers while they are in suspension or on the form or both. Due to the fact that the fibers are in suspension, means are provided to prevent the fibers from deviating from their normal course of travel and adhering to or clogging the spray nozzle 355. In the form illustrated in Figure 21, this is secured by introducing air in the casing 70 and causing it to surround the nozzle 355 and travel in a direction substantially the same as the spray 354. Specifically, the spray mechanism 353 is disposed in a hollow open-ended cylindrical member 356 mounted in the casing 70. The member 356 is open at both the top and bottom thereof and permits air to be sucked therethrough during the operation of the apparatus, with the result that the air thus sucked in will prevent the fibers from changing their normal course of travel and adhering to the nozzle. It is to be noted that the bottom end of the member 356 terminates adjacent the nozzle 355. Thus, the air passing through said member 356 will produce the desired effects. The member 356 is also adjustably mounted so that it may be raised or lowered depending on the position of the nozzle 355.

When the fibers are sized as previously mentioned, it is possible to produce a concave blank, that is, a blank in substantially the finished shape. To secure this, an appropriately-shaped form should be used. One such form 49' is shown positioned in place in the apparatus illustrated in Figure 21, and details thereof are shown in Figures 22 and 23. The form 49' comprises a foraminous member 357, formed into the desired concave shape, and is clamped between a side shaping ring 358 and a bottom member 359, the latter two elements being secured together by means of screws 360. The shaping ring 358 is of a shape corresponding to the peripheral shape of the desired blank. It may be provided with a boss 361 which forms a recess in the blank and indicates where the blank is to be cut to form the final pad. The shaping ring is also provided with one or more recesses 362 which are adapted to cooperate with lugs 363 on the rotating frame 58, so that the form can be readily positioned in the frame and held therein during rotation of the frame without any relative rotation between it and the frame. The lower member 359 of the form is shaped so that it will cooperate with the tube 51 to provide a Venturi-shaped opening 52 through which passes the air which is used for conveying and depositing the fibers on the form 49'.

Except for the details of construction heretofore set forth, the apparatus illustrated in Figure 21 is similar to the details of construction of the apparatus illustrated in Figure 4.

Due to the fact that the fibers, when the apparatus illustrated in Figure 21 is utilized, are coated, it is preferred to position a fabric, such as muslin, on the foraminous support 357 prior to the collection of the fibers thereon. The fibers will tenaciously adhere to the fabric and the fabric will constitute a facing for the bottom of the blank as designated by the reference numeral 350 in Figure 23. Usually, the fabric extends slightly beyond the fibers.

After the blank has been built up, with or without the fabric facing as desired, it is removed from the apparatus as previously described in connection with the blank-forming machine 1. Dependent upon the contour of the form 49', the blank upon removal therefrom may be in a finished condition, whereby it may be cut in half, thereby producing a pair of shoulder pads.

When a skin coating or facing is desired on the top surface of the blank, the blank, after removal from the blank-forming machine 1', is passed on the conveyor 3' beneath the spray 10' as previously described. Thereafter, the blank is conveyed on the conveyor 3' to the baking and forming machine 35', wherein the blank is placed and subjected to heat and pressure for a sufficient time to set or harden the coating material and form a thin flexible coating and set the blank into the desired shape and contour.

When skin coatings are desired on both surfaces of the blank, then both surfaces may be sprayed as, for example, in the manner previously described.

Referring now to the baking and forming machine indicated generally at 35' in Figure 20 and shown in detail in Figures 25, 26 and 27, it will be noted that it is provided with a plurality of molds or forms generally indicated by the reference member 364. A number of molds 364 are provided in order to take care of the capacity of the blank-forming machine 1'. As will be hereafter described, the molds 364 operate in timed sequence so that, when blanks are being heated and formed in several molds, the other molds are ready to receive and operate on blanks.

Each mold 364 comprises a male member 365 and a female member 366. The portion of the male member, as shown in Figure 27, contacting with the blank is of a contour corresponding to the shape desired in the finished blank. Since the size coating, which constitutes the skin surface, and the size coating of the individual fibers are to be set or hardened by heat, the male member 365 is provided with means whereby it may be heated. Though various means may be used, for illustrative purposes the male member 365 is shown as provided with electrical heating means 367 adapted to heat the lower portion and particularly that portion of the male member 365 which engages the blank. The electrical heating means 367 include heating elements 368 and 369 having binding posts 370 whereby they may be connected to a suitable source of power. The lower end of each of the heating elements rests on the opposite ends of a block 372 formed integrally with the male member and is clamped into and held in position by means of a clamping element 372' and a bolt 373 passing therethrough and cooperating with a threaded hole in the block 372 which serves to securely hold the clamping element 372' in the desired position.

Each male member is provided with means whereby it may be raised and lowered at predetermined definite times to permit the insertion of the blank in the mold for baking and the removal thereof from the mold after baking.

Referring now to Figure 26, wherein is illustrated the means for raising and lowering each male member 365, it will be noted that the top of each male member is connected through a separate linkage arrangement, generally indicated at 374, to a lever 375 which is pivotally mounted on a shaft 376. Each lever 375 is provided with a shaft 377 on which is mounted a roller 378 which cooperates with the cam 379 rotatably mounted on a shaft 380.

The cams 379 are so designed and arranged that when one male member is being elevated another male member is being lowered and the remaining male members function in the mold. This is diagrammatically shown in Figures 20 and 25.

The linkage generally indicated at 374 is of such a design and construction to permit the raising and lowering of the male member 365 in a vertical direction. More particularly, the linkage indicated at 374 consists of one or more elements pivotally secured to a lug 381 on top of the male member 365 and also pivotally secured to the lever 375. Specifically, an element having its lower portion bifurcated, as indicated by the reference numeral 382, is pivotally secured to the lug 381 at 383. The opposite end is provided with a threaded bore which receives the threaded portion of the member 384. The member 384 adjacent its upper end is pivotally secured to the lever 375 by means of a pin 385 passing through bores in said member 384 and lever 375. If desired, either the element 384 or the lever 375 may be bifurcated at the place of pivotal connection.

The raising and lowering of the male member 365 are guided by means of rods 386 slidably positioned in the bearings 387 secured to the frame of the machine. It is to be noted that the lower ends of the rods 386 are securely fastened in bosses 388 on the male member.

Each female member is formed of two complementary-shaped members 389, each of which is pivotally secured adjacent their respective lower ends, as at 390, to a block 391 secured to rods 392 slidably mounted in bearings 393 fastened to the frame of the machine. For reasons which will become apparent, each of the side members at each side edge thereof is pivotally connected to a link 394, as at 395, the other end of said link being pivotally connected, as at 396, to a bracket 397 mounted on the frame. A spring 398 cooperates with the bearing 393 and a sleeve 399 and normally urges the rods upward. As a consequence, the side members 389 are forced to move away from each other and to assume an extended or open condition as shown at the left of Figure 25. When a blank has been placed on the female member and the male member descends, due to the pressure exerted thereby the rods 392 are forced downwardly and, due to the block 391 and the links 394, the side members 389 are moved toward each other until the blank and mold assume the position shown at the right in Figure 25 or in Figure 27. When the male member ascends, due to the action of the springs 398 the rods 392 are urged upwardly, with the result that the side members move away from each other and assume their original open position, whereby the blank can be removed and placed on the conveyor 400 which transfers the blank now in final molded condition to the desired place for the next operation.

Each of the side members 389 constituting the female mold is provided with heating means which, in the form shown in Figure 27, comprises a heater element 401 provided with binding posts 402, whereby each heater element may be connected to a suitable source of electricity. Each heating element is secured in place by a clamping element 403.

The apparatus is driven by means of a motor 404 which cooperates with a speed-reducing mechanism 405 of any known type. The speed-reducing mechanism is operatively connected in any suitable manner to drive the shaft 406 on which the pulley 407 is securely fastened. By means of a belt 408 trained over the pulley 407 and pulley 409, the shaft 410 on which the pulley 409 is mounted is driven. The shaft is suitably mounted in bearings 411 and 411' secured to the frame of the machine. At one end of the shaft 410 there is provided a pulley 412, the movement of which is transmitted to a pulley 413 by means of a belt 414. The pulley 413 drives a shaft 415 on which it is secured. On the shaft 415 there is also provided another pulley 416 which imparts movement to the belt 400 which is trained over said pulley 416 and over a pulley 416'. Adjacent the other end of the shaft 410, there is provided a gear 417 which drives the gear 418 securely fastened to the cam shaft 380. It is to be noted that each of the shafts and pulleys are mounted in appropriate bearings carried by the frame.

The blank, as it is removed from the mold, is of substantially the form illustrated in Figure 28. This blank is then cut in half whereby a pair of shoulder pads, one of which is illustrated in Figure 29, is obtained.

Referring now to Figure 29, it will be noted that the pad is of a shape and contour to be used in coats and other garments. It consists of a mass of matted, felted and interlocked fibers adhesively secured together and adhesively secured to a facing 350. The opposite surface of the pad is provided with the skin surface 352. It is clear that the shoulder pad produced in accordance with the foregoing process and by the above-described apparatus is ready for use and is in the form desired. The workman does not have to shape the pad when he sews it into a garment. It is further to be noted that the pad does not require any facing material to be sewed thereto. The facing, i. e. the cloth facing 350, and the skin coating 352 are formed in situ during the production of the pad.

Although certain embodiments of this invention have been described in detail for purposes of illustration, it is to be understood that the invention is not to be limited thereto but that various changes and modifications may be made therein as will appear to a person skilled in the art. The invention is only to be limited in accordance with the following claims when interpreted in view of the prior art.

We claim:

1. The method of forming a shoulder pad blank which consists in successively advancing under air pressure a suspended stream of individual fibers, intercepting the advancing stream to cause a mass of the fibers to be built up and matted together, confining the built-up mass as formed to control the shape of the blank, increasing the air velocity of the stream passing centrally of the place of interception to cause a greater quantity of the fibers to be built up centrally of the blank being formed, and compressing the built-up blank to expel the entrapped air.

2. The method of forming a shoulder pad blank which consists in successively advancing under air pressure a suspended stream of individual fibers, intercepting the advancing stream to cause a mass of the fibers to be built up and matted together, confining the built-up mass as formed to control the shape of the blank, increasing the air velocity of the stream passing centrally of the place of interception to cause a greater quantity of the fibers to be built up centrally of the blank being formed, expelling the entrapped air from the blank, then applying a liquid binding coating to opposite faces of the blank, and then compressing the coated blank under heat and pressure.

3. The method of forming a shoulder pad blank which consists in successively advancing under air pressure a suspended stream of individual fibers, intercepting the advancing stream to cause a mass of the fibers to be built up and matted together, confining the built-up mass as formed to control the shape of the blank, increasing the air velocity of the stream passing centrally of the place of interception to cause a greater quantity of the fibers to be built up centrally of the blank being formed, applying a coating of a liquid binding material to a face of the blank, then applying a fabric sheet over the said coating before it becomes set, and then compressing the blank under heat and pressure to intimately unite the sheet to a face thereof and set the fiber mass.

4. A machine for making shoulder pad blanks comprising a picker roll, means feeding a web of fibrous material thereto, means rotating said picker roll so that the fibers are pulled apart and removed from said web, an air duct having blower means associated therewith to produce an air current for picking up said fibers and holding the same in suspension, a form interposed in said air current to intercept and receive the suspended fibers whereby a matted blank is built up thereon, means to increase the air velocity of said air current passing centrally through the form, and means for causing relative rotary motion between said form and stream of suspended fibers.

5. A machine for making shoulder pad blanks comprising a picker roll, means including a conveyor apron and a pair of rotating feed rolls feeding a web of fibrous material thereto, means rotating said picker roll so that the fibers are pulled apart and removed from said web, an air duct having blower means associated therewith to produce an air current for picking up said fibers and holding the same in suspension, a form interposed in said air current to intercept and receive the suspended fibers whereby a matted blank is built up thereon, means to increase the air velocity of said air current passing centrally through the form, and means for causing relative rotary motion between said form and stream of suspended fibers.

6. A machine for making shoulder pad blanks comprising a hopper adapted to receive fibers, means to pass a current of air through said hopper for picking up said fibers, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form, means to increase the air velocity of said air current passing centrally through the form, and means for causing relative rotary motion between said form and stream of suspended fibers.

7. A machine for making shoulder pad blanks comprising a hopper adapted to receive fibers, means to pass a current of air through said hopper for picking up said fibers, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form, and means to adjust the distance between said throat and said form for varying the area and distribution of the fibers.

8. A machine for making shoulder pad blanks comprising a hopper adapted to receive fibers, means to pass a current of air through said hopper for picking up said fibers, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form and said throat having a discharge area less than that of the form and being spaced therefrom to cause a greater quantity of fibers to be deposited at the center of the form than at the edges thereof.

9. A machine for making shoulder pad blanks comprising a hopper adapted to receive fibers, means to pass a current of air through said hopper for picking up said fibers, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form, a second duct having a restricted opening below said form, said restricted opening cooperating with said throat to control the distribution of fibers over the form, and means for causing relative rotary motion between said form and stream of suspended fibers.

10. A machine for making shoulder pad blanks comprising a hopper adapted to receive fibers, means to pass a current of air through said hopper for picking up said fibers, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form, suction means including a Venturi-shaped opening below said form cooperating with said throat to create a greater air velocity at the center of the form than at the edges thereof whereby a corresponding distribution of fibers is obtained, and means for causing relative rotary motion between said form and stream of suspended fibers.

11. In a machine for making shoulder pad blanks, an air duct, means to pass therethrough a stream of soft fibers suspended in an air current, a form adapted to collect the fibers as a compacted, matted, built-up blank, said air duct having an adjustable discharge throat adapted to discharge said fibers onto said form, suction means including a Venturi-shaped tube below said form and cooperating with said throat to distribute the fibers over said form in a predetermined manner, and means for rotating said form so that the fibers are caused to be uniformly deposited thereon and to build up a non-stratified matted blank.

12. A machine for making shoulder pad blanks comprising a turret having a plurality of openings therein, a form for shoulder pad blanks positioned in each of said openings, means intermittently rotating said turret to successively feed the various forms to fiber-receiving position, an air duct adapted to supply to the form in said position an air current carrying a stream of suspended fibers whereby the fibers are deposited on said form to build up said blank, a suction cup adapted to register with said form after said form has been advanced by rotation of said turret beyond the fiber-receiving position, means applying suction to said cup for removing the blank from said form, means to transfer said cup to discharge position, and means to break the suction when the cup is in the last position for permitting the blank to be removed therefrom.

13. A machine for making shoulder pad blanks comprising a turret having a plurality of openings therein, a form for shoulder pad blanks positioned in each of said openings, means intermittently rotating said turret to successively feed the various forms to fiber-receiving position, an air duct adapted to supply to the form in said position an air current carrying a stream of suspended fibers whereby the fibers are deposited on said form to build up said blank, a suction cup adapted to register with said form after said form has been advanced by rotation of said turret beyond the fiber-receiving position, means applying suction to said cup for removing the blank from said form, a conveyor belt for said blank, means to transfer said cup with the blank therein into discharge position over said conveyor belt, and means to break the suction when the cup is in the last position to cause the blank to drop onto said conveyor belt.

14. A machine for making shoulder pad blanks comprising a turret having a plurality of openings therein, a form for shoulder pad blanks positioned in each of said openings, means intermittently rotating said turret to successively feed the various forms to fiber-receiving position, an air duct adapted to supply to the form in said position an air current carrying a stream of suspended fibers whereby the fibers are deposited on said form to build up said blank, a suction cup adapted to register with said form after said form has been advanced by rotation of said turret beyond the fiber-receiving position, and means applying suction to said cup for removing the blank from said form.

15. A machine for making shoulder pad blanks comprising a turret having a plurality of rotatable frames therein, a form removably held in each frame to receive fibers for building up the shoulder pad blank, means intermittently rotating said turret for progressively bringing said frames into fiber-receiving position, and a continuously driven belt adapted to engage the frame when in fiber-receiving position for causing rotation thereof.

16. A machine for making shoulder pad blanks comprising a turret having a plurality of rotatable frames therein, each frame having driving means associated therewith, a form removably held in each frame to receive fibers for building up the shoulder pad blank, means intermittently rotating said turret for progressively bringing said frames into fiber-receiving position, and a continuously driven belt extending across a chord of the turret and positioned to engage each of said driving means when any portion of the corresponding frame is in fiber-receiving position.

17. A form for building up a shoulder pad blank comprising an open mesh bottom member and a side-shaping ring having a central opening conforming to the shape of a pair of joined pads, said ring having at least one boss adapted to form a recess in the periphery of the blank to serve as a guide for cutting the pads apart.

18. A machine for making shoulder pad blanks comprising means for suspending a stream of soft fibers in an air current, a form to collect a mass of said fibers as a compacted, matted, built-up blank, means to direct said air current with the suspended fibers onto said form, means for causing relative rotary motion between said form and stream of suspended fibers, and suction means including a duct having a restricted opening beneath said form to cause the air current to have a greater velocity at the center of the form than at the edges thereof whereby the fibers deposited at the center of said form are more numerous and more closely compacted than the fibers at the edges of said form, said form comprising an open mesh bottom member and a side-shaping ring having a central opening conforming to the shape of a pair of joined pads, said ring having at least one boss adapted to form a recess in the periphery of the blank to serve as a guide for cutting the pads apart.

19. A machine for making shoulder pad blanks comprising a hopper adapted to receive fibers, means to pass a current of air through said hopper for picking up said fibers, means to apply an adhesive to the fibers while in the suspended state, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form, and means to adjust the distance between said throat and said form for varying the area and distribution of the fibers.

20. A machine for making shoulder pad blanks comprising a hopper adapted to receive fibers, means to pass a current of air through said hopper for picking up said fibers, means to apply an adhesive to the fibers while in the suspended state, a form adapted to collect a mass of said fibers as a compacted, matted, built-up blank, a duct receiving from said hopper the air currents with the fibers suspended therein, said duct having a throat positioned to discharge the air currents onto said form, said throat being disposed above and at the central axis of the form and said throat having a discharge area less than that of the form and being spaced therefrom to cause a greater quantity of fibers to be deposited at the center of the form than at the edges thereof.

AARON FREYDBERG.
WILLIAM H. HAWKINS.